E. H. REMDE

Feb. 14, 1933. INDUSTRIAL TRUCK Re. 18,737

5 Sheets-Sheet 1

Original Filed Nov. 13, 1926

Inventor
Edward H. Remde
By Geo. A. Tritt
Atty.

E. H. REMDE

Feb. 14, 1933. INDUSTRIAL TRUCK Re. 18,737

5 Sheets-Sheet 2

Original Filed Nov. 13, 1926

Inventor
Edward H. Remde
By Geo. A. Pitts
Atty

E. H. REMDE

Feb. 14, 1933.

INDUSTRIAL TRUCK

Re. 18,737

5 Sheets-Sheet 3

Original Filed Nov. 13, 1926

Inventor
Edward H Remde
By Geo A Pitts
Atty.

Feb. 14, 1933.

E. H. REMDE

INDUSTRIAL TRUCK

Re. 18,737

5 Sheets-Sheet 4

Original Filed Nov. 13, 1926

Inventor
Edward H. Remde
By
Geo B. Fitts
Atty

E. H. REMDE

Feb. 14, 1933. INDUSTRIAL TRUCK Re. 18,737

5 Sheets-Sheet 5

Original Filed Nov. 13, 1926

Inventor
Edward H. Remde
By Geo. A. Pitt
Atty.

Reissued Feb. 14, 1933 Re. 18,737

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Original No. 1,827,878, dated October 20, 1931, Serial No. 148,240, filed November 13, 1926. Application for reissue filed February 23, 1932. Serial No. 594,674.

This invention relates to an industrial truck capable of engaging and lifting a load, transporting it from one location to another and discharging it at the latter position.

One object of the invention is to provide an improved truck of this character having an elevating member capable of moving upwardly and downwardly and also laterally relative to the longitudinal axis of the truck, whereby the picking up of a load and its discharge is greatly facilitated.

Another object of the invention is to provide an improved industrial truck in which the elevating member is movable along an inclined plane, whereby the load can be discharged in close engagement with an upstanding wall or readily removed therefrom.

Another object of the invention is to provide an improved industrial truck in which the elevating member is movable along an inclined plane and also laterally relative to the longitudinal axis of the truck, whereby loads may be readily discharged in close engagement with or removed from up-standing walls in front of or at one side of the truck.

A further object of the invention is to provide an improved truck having an elevating member so mounted that loads can be engaged and picked up with great facility and readily discharged in predetermined positions, whereby the storing space may be filled with the maximum number of loads.

Other objects of the invention will be apparent to those skilled in the art to which my invention relates from the following description taken in connection with the accompanying drawings, wherein Fig. 1 is a side elevation of a truck embodying my invention.

Fig. 9 is a fragmentary section on the line 9—9 of Fig. 2.

Fig. 10 is a plan view of parts shown in Fig. 9.

Fig. 11 is a fragmentary section of the power means for moving the load engaging and carrying member laterally or transversely, such section being on the line 11—11 of Fig. 6.

Figure 6:
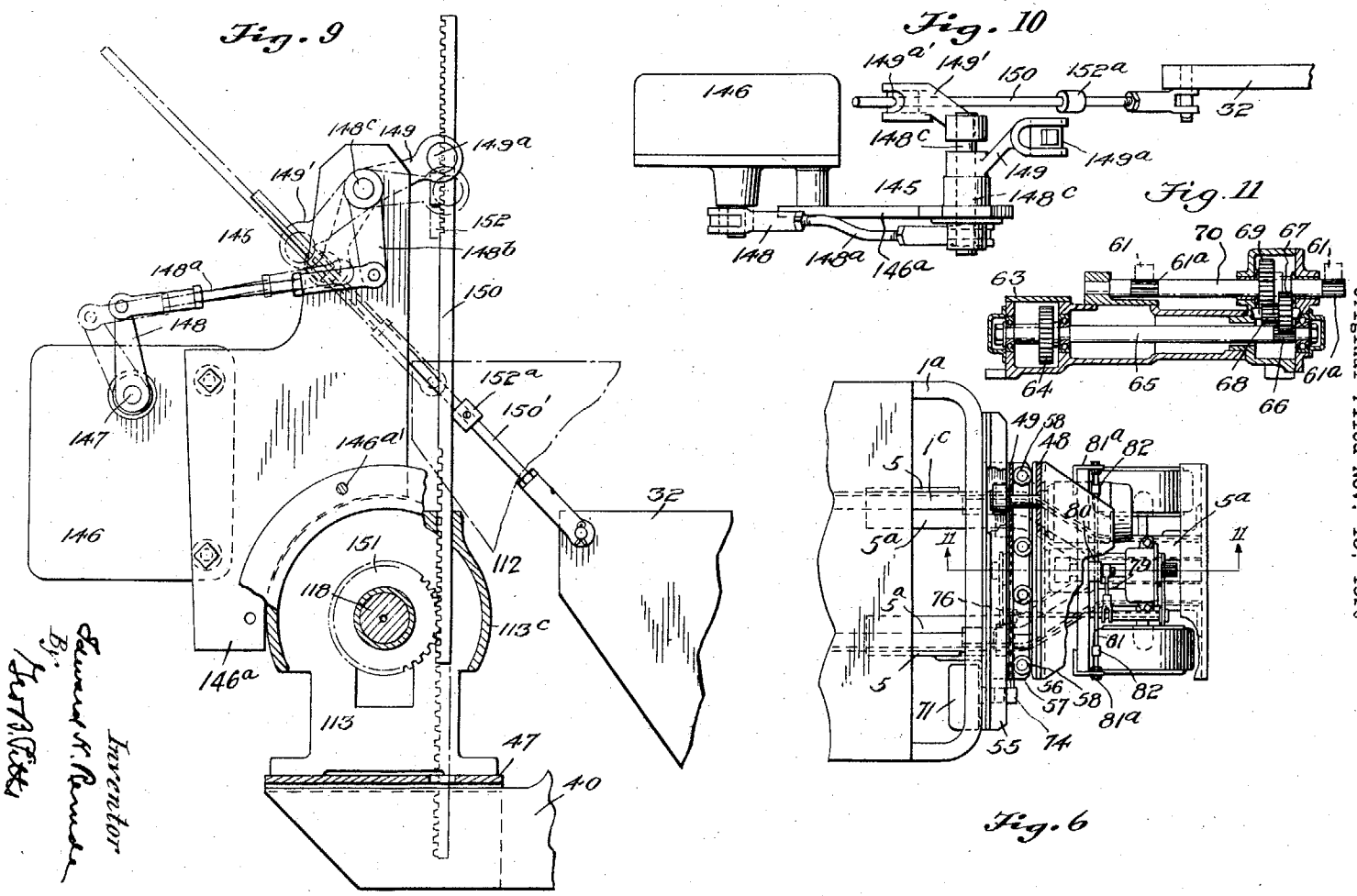
Fig. 6 is a fragmentary section substantially on the line 6—6 of Fig. 3.

In the drawings, 1 indicates a frame mounted on a plurality of wheels, preferably two pairs of wheels 2, 3, either pair of which may be driven. In the preferred form of construction, the frame 1 is constructed to form a main section 1*a* and a relatively low section 1*b*, in which arrangement the wheels 3 are relatively small so that the driving means, which are mounted in a suitable housing 4, are operatively connected to the wheels 2. The main frame section 1*a* includes longitudinal sills 1*c* from which depend drop plates 5. The low frame section 1*b* comprises a pair of members 5*a* (see Fig. 6) connected at their inner ends to the drop plates 5 and bent inwardly at their outer ends so as to lie between the wheels 3 and connected by an angle bar 6. The horizontal flange 6*a* of the bar 6 serves as a track or guide, as will hereafter appear. The housing 4 is connected with a cradle 7, which supports a motor 8, the motor being connected through a propeller shaft with the driving means within the housing 4 to drive the wheels 2. The cradle 7 and housing 4 are operatively connected to the frame 1 by a suspension mechanism, one element thereof being shown at 9; but no claim is made herein to such mechanism since the same forms the subject-matter of an application filed by John H. Hertner, of Cleveland, Ohio, and myself jointly (see Letters Patent No. 1,628,145).

10 indicates a source of power supply, preferably comprising electric batteries, enclosed in a casing 11 and supported on the frame section 1*a* and supplying current to the motor 8. 12 indicates a pair of uprights supporting below the frame section 1*a* a pair of brackets 13 and above the frame section a dash 14 and a controller 15. 16 indicates a platform on which the operative stands to operate the truck and its load engaging and carrying member, indicated as an entirety at 17. The platform 16 is mounted on a shaft 16*a*, suitably carried by the brackets 13. The controller 15 is operated in the usual manner through an arm 15*a* and a link 15*b* connected to a hand lever 18 swingably mounted on the dash 14. 19 indicates a brake mechanism comprising a wheel fixed to the extended end of the propeller shaft and engaged by suitable braking elements 19*a*. The elements 19*a* are operated to engage and disengage the wheel by devices 19*b*, to which a linkage 20 is operatively connected. The linkage 20 is connected with a foot pedal 21 which is associated with the platform 16. 22 indicates a spring connected to the linkage 20 and normally tending to hold the braking elements 19*a* in engagement with the brake wheel, and the foot pedal in the position shown in Fig. 1, so that operation of the latter downwardly will release the brake and permit driving of the truck. 23 indicates a switch mechanism interposed in the motor circuit and connected by devices 24 with the linkage 20, so that the circuit will be opened when the brake elements 19*a* are applied and closed when the brake elements are released from the brake wheel.

Either or both pairs of wheels 2, 3, may be steered, but by preference I steer both pairs of wheels to insure turning of the truck in small areas. For this purpose, the wheels 2 are mounted on knuckles 25 and the wheels 3 are mounted on knuckles 26 at the opposite end of an axle 27, fixed to the underside of the frame section 1*b* by angles 27′. The wheels 2, 3, are connected for simultaneous steering by devices 28, operated through an arm 29 on the lower end of a steering column 30 having an operating device 31, preferably comprising a handle or tiller.

Figures 1, 2:
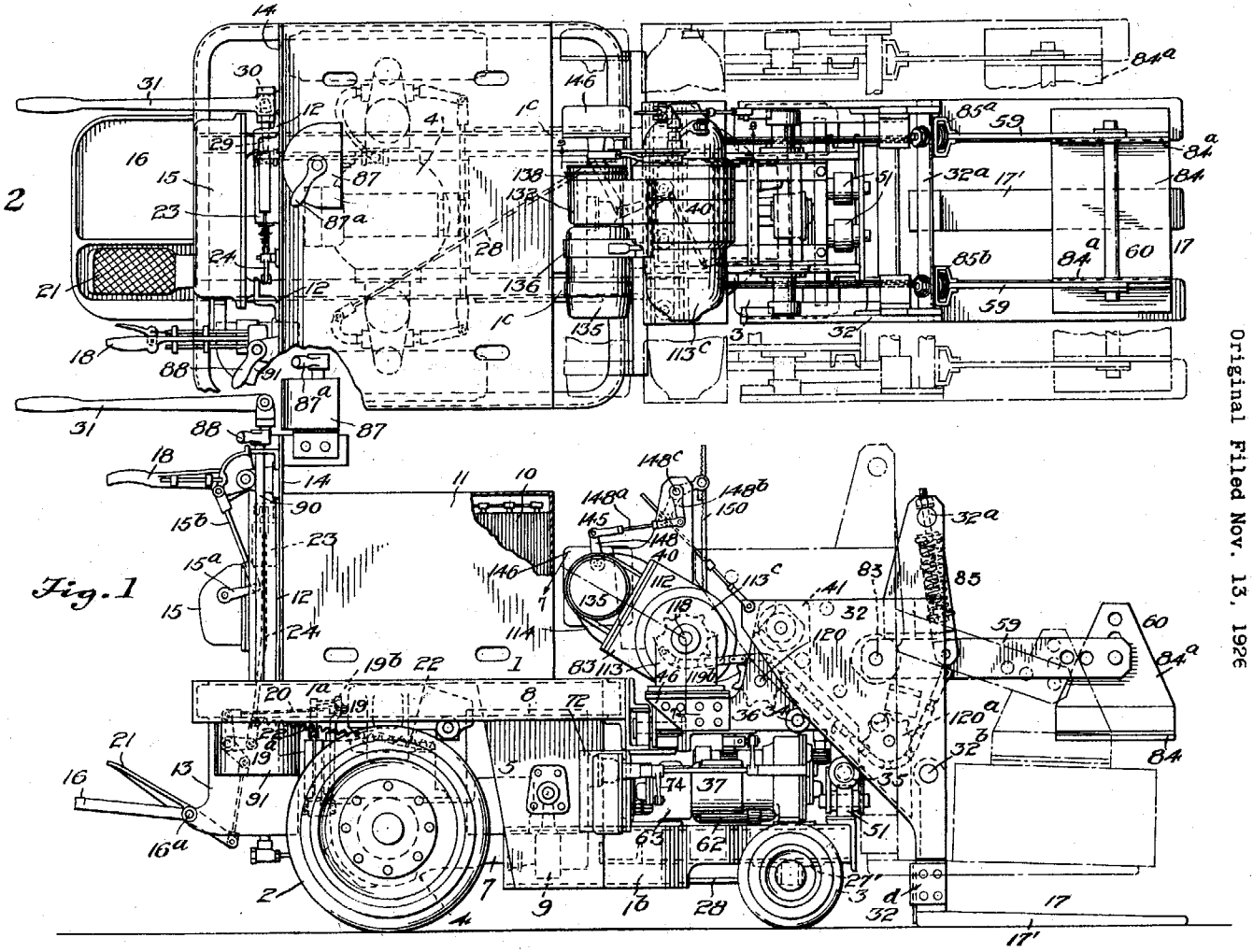
Fig. 2 is a plan view of the truck; the lateral positions of the load engaging member when lowered and raised being partially shown in dotted lines.

The load engaging and carrying member 17 is mounted to move upwardly and downwardly and also laterally relatively to the longitudinal axis of the frame 1, preferably to either side of such axis, as shown in dotted lines in Fig. 2. Several advantages follow from this construction and arrangement, for example, if the truck has been driven up to the position to engage a load and the operative sees that the elevating member is not in proper position or in line with the center of the load, he may shift the member laterally without backing off the truck and making another attempt to drive the truck into proper position. This same operation may be effected where the load is to be discharged in a certain position. This construction is also advantageous where loads of substantially uniform size are to be stacked, one on another since it enables them to be evenly stacked without manipulating the truck to secure this result or manually shifting each load as it is discharged. This construction also permits the loads to be discharged in close engagement with lateral upstanding walls. In trucks of this general type, the truck frame is relatively wide at one end to secure stability and to provide ample room for batteries and the traction motor, whereas the load carrying member is relatively narrow so that it may be projected below a skid and then raised. This arrangement prevents the discharge of a load against or the picking up of a load adjacent an upstanding wall except by driving the truck in an endwise direction, but in my present construction, the truck may be driven in a direction parallel to a wall and the load discharged in close engagement therewith or picked up therefrom since the load carrying member may be moved laterally toward the wall and hence discharge the load adjacent thereto or pick the load up from such position.

My invention may be used to advantage in loading and unloading freight cars and other walled areas, particularly where dunnage is used between the loads and also between the loads and the walls. To secure the most advantageous results, the load engaging and carrying member, instead of moving vertically to lift a load or discharge it, is mounted to move in an inclined plane (see Fig. 1), so that in discharging a load it is moved downwardly toward the flooring and also outwardly toward the dunnage with the result that the latter is engaged and held relatively stationary by the load. By mounting the load engaging and carrying member to move laterally and also outwardly in the longitudinal plane of the frame 1, it may be operated to advantage under these particular conditions. By proper positioning of the truck, the loads may be discharged in tight engagement with the dunnage to insure maximum loading of the freight car or other space and to avoid movement of the loads one relative to the other while the car is in transit. By reason of this mounting, the unloading of a freight car may be readily effected, since in raising the load engaging member or in moving it laterally inwardly, the load is bodily moved away from the other loads or the adjacent wall.

Of the load engaging and carrying member 17, 32 indicates a pair of spaced plates connected together by a plurality of devices, for example, the rods 32*a* and 32*b*, a plate 32*c* and a yoke or brace 32*d*. The plates 32 are shaped to provide depending legs 32′ and the plate 32*c* and brace 32*d* are connected to the legs near their lower free ends. The rod 32*b* serves as a support for a plurality of L-shaped members 17′, their vertical portions depending from the rod 32*b* and normally resting against the plate 32*c*, so that their horizontal portions may normally extend outwardly in a horizontal direction, whereby, upon the operation of the truck, they may be projected below a load to engage and lift it or be removed from below a load when and after the latter is lowered into its discharging position. The L-shaped members 17′ may be adjusted along the support independently of each other and fixed in their adjusted position in any desired manner. For reasons already set forth, the member 17 is raised and lowered in an inclined plane, preferably approximating an angle of 45 degrees. By preference, the guides, indicated at 33, are carried by the inner walls of the plates 32 and engage pairs of rolls 34, 35, mounted on a base member, indicated as an entirety at 36, adapted to be moved preferably by a suitable means, indicated as an entirety at 37, laterally in either direction relative to the longitudinal axis of the frame 1, to the positions shown in dotted lines in Fig. 2. The guides 33 may comprise plates secured to the plates 32 and having their upper and lower side edges disposed parallel to each other, the lower edges engaging the rolls 34, 35, and their upper edges engaging rolls 38, mounted on stud shafts 39 extending laterally from the uprights 41 forming parts of the base member 36. These latter rolls maintain the load engaging and carrying member 17 in upright position and prevent it from tipping while moving on the rolls 34, 35, and hence co-act with the latter to guide the member 17 in the desired direction.

Figure 3:
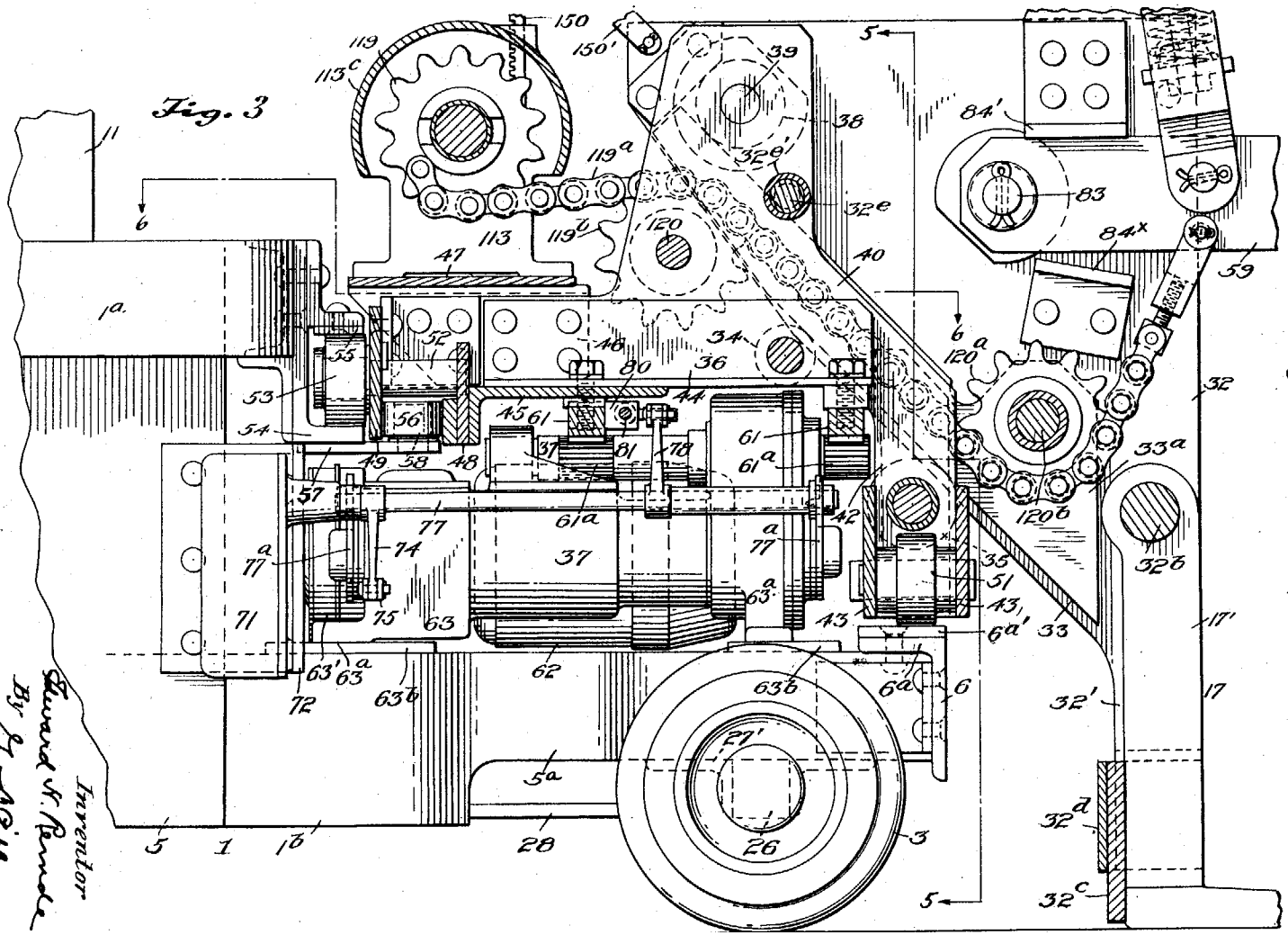
Fig. 3 is a fragmentary view enlarged, partly in side elevation and partly in section on the line 3—3 of Fig. 4.
Figures 4, 5:
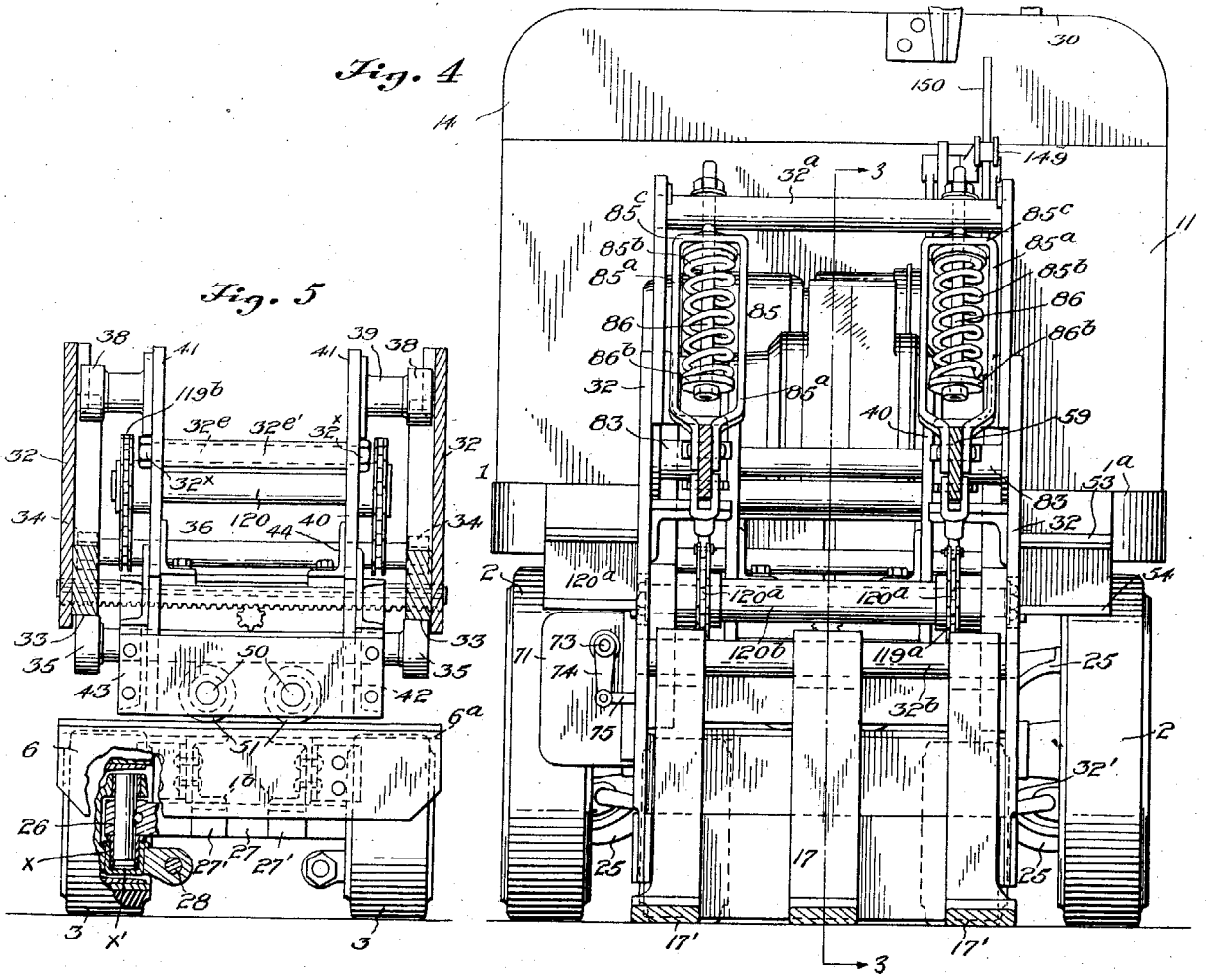
Fig. 4 is an end view of the parts shown in Fig. 3, looking toward the left.
Fig. 5 is a section on the line 5—5 of Fig. 3.

The base member 36, in the form of construction herein illustrated, comprises the following: 40 indicates side plates having upright portions 41 (already referred to) connected by a rod 32*e* having a spacing sleeve 32*e*′ thereon between the plates to which the plates are secured by nuts 32*x*, and depending portions 42. The depending portions are connected by transverse plates 43 disposed against the opposite side edges thereof and secured to said portions in any desired manner. 44 indicates angles extending along inner walls of the plates 40. The angles 44 are secured to a transverse angle 45 and angles 46. The angles 46 support a base plate 47 and the angles 45 and 46 support a pair of transverse plates 48, 49, the purpose of which will later appear. The plates 43 are formed with pairs of aligned openings for shafts 50 on which are loosely mounted rollers 51 engaging the flange 6*a* or a wear plate 6*a*′, thereon; whereas the plates 48, 49, support a pair of shafts 52, on which rollers 53 are loosely mounted. The rollers 53 roll on a track or guide 54 extending transversely along and suitably supported by the rear wall of the frame section 1*a* (see Fig. 3). 55 indicates a guide mounted on the frame section 1*a* in spaced relation to the track 54 and arranged to be engaged by the rollers 53 to prevent the base member 36 from tipping upwardly due to the weight of a load on the member 17.

56 indicates as an entirety a means for guiding the base member 36 in its traversing movements. Of these means, 57 indicates a transverse plate preferably riveted to the under side of the angle constituting the track 54 and extending outwardly therefrom. Along its free edge, the plate 57 carries a series of up-standing stud shafts 58 disposed in a plane at right angles to the longitudinal axis of the frame 1. Rollers 59 are loosely mounted on the shafts 58 and engage with the inner opposing faces of the plates 48, 49, or wear strips thereon, and co-act therewith to insure the lateral travel or traversing movements of the base member 36 and parts carried thereby transversely and to maintain the supporting rollers 51 and 53 in rolling relation with their respective tracks 6*a*, 54.

112 indicates as an entirety a power mechanism for raising and lowering the elevating member 17. Of this mechanism, 113 indicates standards mounted on the base 47 and provided with hollow bosses 113*b* and inwardly extending casing sections 113*c* which cooperate with casing members 114, 115, to form a housing for a power transmitting mechanism 116 and gear reductions 117 to be later referred to. The hollow bosses 113*b* support the outer ends of shafts 118, which shafts are preferably pressed therein in a well known manner. 119 indicates winding elements, such as sprockets, rotatably mounted on the shafts 118, for chains 119*a* which wind thereon and therefrom in operating the member 17. The chains may have their inner ends fixed to the sprockets—see Fig. 3. The chains are guided around sprockets 119*b*, loosely mounted on a shaft 120, supported by the plates 41. The outer portions of the chains run around sprockets 120*a*, loosely mounted on a shaft 120*b*. The shaft 120*b* is suitably supported at its opposite ends in the plates 32 and extended walls 33*a* of the guide 33, the free ends of the chains 119*a* being connected to bars 59′ forming parts of a clamping mechanism 60, to which reference will later be made. By means of these connections, the chains 119*a* operate to raise the load engaging and carrying member 17 when the sprockets 119 are rotated in one direction and to lower the member 17 when the sprockets are rotated in the opposite direction. 121 indicates disks also rotatably mounted on the shafts 118, the hub of each disk and the hub of the adjacent sprocket 119 being connected, preferably by clutch elements 121*a*, whereby the disks—when rotated—will drive the sprockets.

Figures 7, 8:
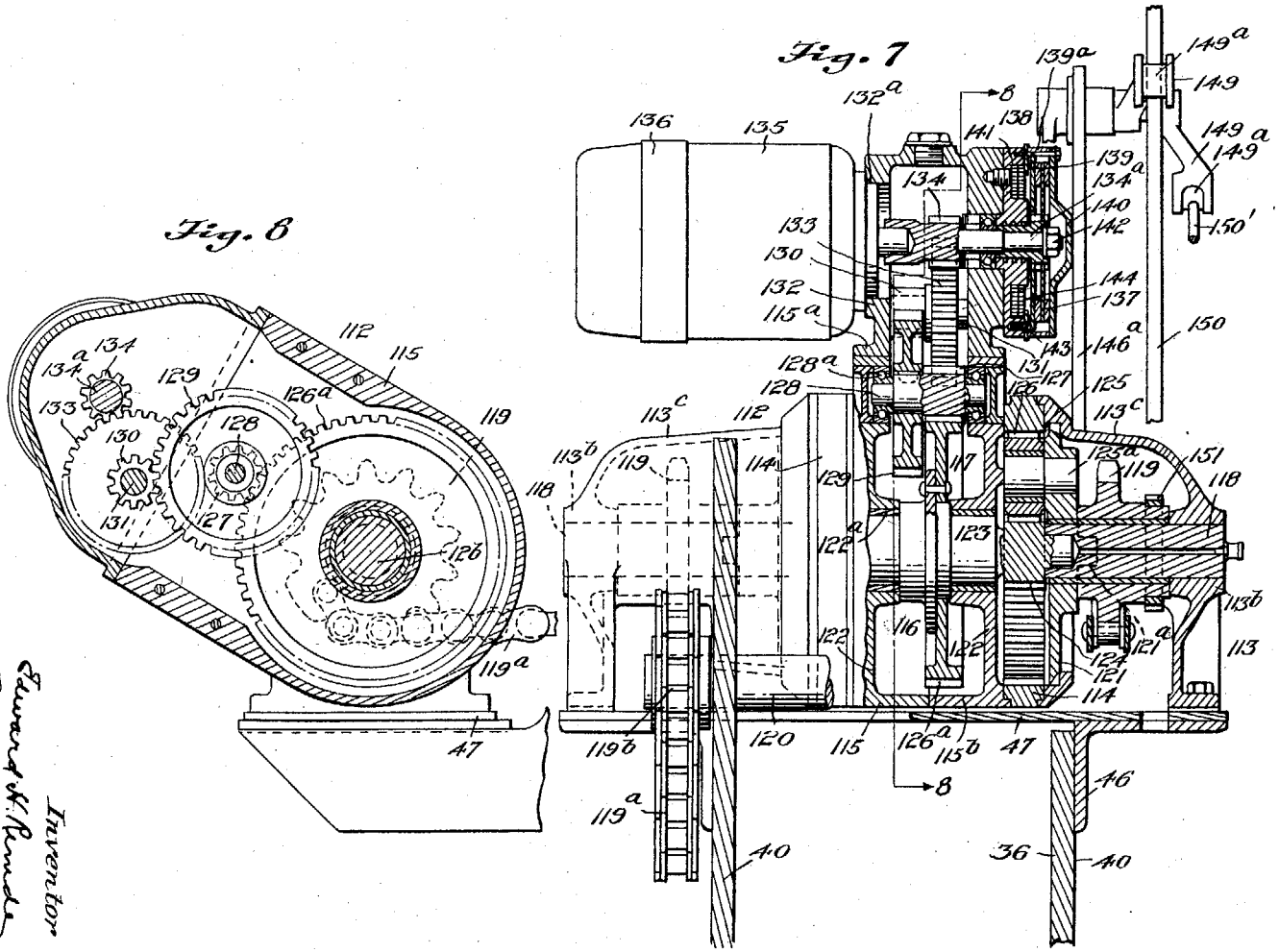
Fig. 7 is a fragmentary view partly in section, of the means for raising and lowering the elevating member and its motor; being a view along the line 7—7 of Fig. 1 in the direction of the arrows.
Fig. 8 is a section on the line 8—8 of Fig. 7.

122 indicates webs or walls on the outer ends of the casing sections 115 and having axial openings 122*a* forming bearings for a driven shaft 123 which projects at its ends through the bearings and carries outwardly thereof pinions 124. The outer ends of the shaft are reduced and rotatably fit openings formed in the inner ends of the shafts 118, the pinions 124 being preferably formed integrally with the shaft and the center portion of the latter being enlarged to form shoulders that engage the bearing walls to prevent endwise movement of the shaft. The pinions 124 mesh with gears 125 rotatably mounted on stud shafts 125*a* carried by the disks and the gears 125 in turn mesh with internal ring gears 126 provided in the inner walls of the sections 114, whereby a planetary gear reduction is provided between the shaft 123 and each disk 121. 126*a* indicates a gear fixed to the shaft 123 substantially centrally thereof and in mesh with a pinion 127 fixed to a shaft 128 which is mounted at its ends in suitable bearings 128*a*. The bearings 128*a* are mounted in a well known manner in hollow bosses 115*a* provided on the upper portions of the casing members 115. 129 indicates a gear fixed to the shaft 128 and meshing with a pinion 130 fixed to a shaft 131 mounted in a supplemental or cover section 132. 133 indicates a gear fixed to the shaft 131 and meshing with a pinion 134 fixed to a shaft 134*a*, which is connected (preferably detachably) at one end to the shaft of a motor 135 arranged to be supplied with current from the batteries 10. The adjacent end of the motor casing removably fits the walls of an opening 132*a* formed in the side wall of the cover section 132, being held rigidly in such position by a bracket or cradle extending laterally from the cover section 132 and a strap or other clamping device 136 engaging the motor casing and bracket. The other end of the shaft 134*a* is mounted in suitable bearings in an opening in the adjacent side wall of the cover section and extends therethrough and carries on its outer or free end a disk 137, which constitutes one element of a brake 138. The other element of the brake consists of a disk 139 held against rotation by but slidable on a series of bolts 139*a* which secure the cover 140 to a plate 141 having a boss fitting the bearing opening and secured therein by the shoulder of a sleeve secured on the outer end of the shaft 134*a* by a nut 142, the latter also securing the brake element 137 to the shaft. The non-rotatable disk 139 is normally pressed outwardly by a plurality of springs (one being shown at 143 in Fig. 7) into engagement with the disk 137 to brake it or hold it aganist rotation. The disk 139 is formed of soft iron and is operated inwardly, against the tension of the springs 143, by a winding 144, when the latter is energized. The winding 144 is connected in series with the motor 135, so that when the latter is started the coil is energized and the brake released.

The limit switch mechanism 145 comprises a casing 146 secured to an up-standing bracket 146*a*. The bracket is secured to one side of the casing 112 by the bolts or cap screws 146*a*′ (see Fig. 9). The casing 146 encloses a pair of switches either of which is opened to break the motor circuit by a device within the casing and operated by the rock shaft 147. 148 indicates an arm fixed to the rock shaft 147. The limit switch mechanism 145 for the motor 135 is operatively connected with the load engaging and carrying member 17 and with one of the driven sprockets 119. By means of the connections between the switch mechanism and the adjacent sprocket 119, the switch mechanism is operated to stop the motor 135 when the member 17 reaches its limit of movement downwardly; whereas, by means of the connections between the switch mechanism and the load engaging and carrying member 17, the switch mechanism is operated to stop the motor when the member reaches its limit of movement upwardly. These separate connections are required by reason of the fact that the hoist chains 119*a* are operatively connected to the clamping means, already referred to, and it is desirable to stop the motor when the load engaging and carrying member 17 has moved upwardly a predetermined distance, but if in the downward movement of the member 17 the connections with the switch mechanism were arranged to operate the latter and an obstruction should prevent the complete downward movement of the member 17, then these connections would be ineffective to stop the motor. By providing separate connections controlled by one of the sprockets 119, or other driven element, I prevent the paying out of the hoist chains 119*a* beyond a predetermined amount. These operating connections may consist of the following: 148*a* indicates a link connected at one end to the arm 148 and at its opposite end to an arm 148*b* fixed to a shaft 148*c*. 149 indicates an arm fixed to the shaft 148*c*. The outer end of the arm 149 is bifurcated and formed with aligned openings to receive a rotatable plug 149*a* which is slotted to slidably receive a bar 150. The bar 150 extends downwardly through and slidably fits aligned openings formed in the adjacent casing section 113*c*. The inner edge or face of the bar 150 is provided with a rack which meshes with a pinion 151 fixed to the hub of the adjacent sprocket 119, whereby the pinion 151 is rotated and the bar moved endwise upwardly or downwardly when the power transmitting mechanism is operated. The upper portion of the bar 150 is provided with an adjustable tappet 152 which serves to engage the arm 149, when moved downwardly and thus effect an opening or breaking of the motor circuit following the rotating of the sprockets 119 to pay out the chains 119*a* and lowering of the lift member 17 to its lowermost position. 149′ indicates a separate arm fixed to the shaft 148*c*, its outer end being bifurcated and formed with aligned openings to receive a rotatable plug 149*a*′. The plug 149*a*′ is slotted to slidably receive a rod 150′ pivotally connected at its lower free end to the adjacent side plate 32 (see Fig. 9), whereby the rod is moved endwise by the member 17. Near its lower end, the rod 150′ carries an adjustable tappet 152*a* which, in the upward movement of the member 17 a predetermined distance, is adapted to engage the arm 149′ and through it and the connections referred to with the switch mechanism, to open the motor circuit and thus stop the motor 135.

The means 37 for moving or traversing the base member 36 and parts carried thereby laterally or transversely preferably comprise one or more racks and a pinion engaging each rack. In the present illustrated form of construction I provide two spaced racks 61 on the lower side of the base member 36 and mount the pinions 61*a* on the frame section 1*b*. By preference the pinions are power driven by a motor 62, receiving current from the batteries 10. The motor 62 is associated with a casing 63 having at one end suitable gear reduction driven by the shaft of the motor and driving a gear 64 (see Fig. 11) and having at its other end a gear train for driving the pinions 61*a*. The shaft for the motor 62 is extended and provided with a member with which a magnetically controlled brake element engages. The member and elements and the control devices for the latter are mounted in a housing 63′ and are preferably similar to like elements and parts shown in Fig. 7. The casing 63 is provided with feet or standards 63*a* resting on cross pieces 63*b* carried by the frame section 1*b* (see Fig. 3). The gear 64 is keyed to a shaft 65 having a pinion 66. The pinion 66 drives a gear 67 mounted in the casing walls and having fixed to it a pinion 68 in mesh with a gear 69. The gear 69 is fixed to a shaft 70 which extends beyond the walls of the casing and carries the pinion 61*a*. This arrangement provides for the positive driving of the pinions 61*a* at the same speed.

71 indicates a casing containing pairs of contacts, one of which is opened to break the circuit to the motor 62 when the base member 36 reaches a predetermined position in moving laterally in either direction. The casing 71 is mounted on an angle 72 carried by one of the drop plates 5. 73 indicates a rock shaft carrying within the casing devices to control the opening of either pair of contacts. On its outer end, the shaft 73 is provided with an arm 74 to which is pivoted one end of a link 75. The opposite end of the link 75 is pivotally connected to an arm 76 fixed to a shaft 77. The opposite ends of the shaft 77 are suitably supported by brackets 77*a* preferably secured to the covers or end walls of the casing 63 and extending to one side thereof. 78 indicates a separate arm carried by the shaft 77 and carrying a link 79 pivotally connected to a cross head 80. The cross head 80 is formed with an opening through which slides a rod 81 supported at its opposite ends by suitable brackets 81*a* extending from the free ends of the adjacent rack 61. Near its opposite ends, the rod 81 carries adjustable tappets 82, each arranged to engage the cross head when the base member 36 is moved laterally and through such cross head, link 79, arm 78, shaft 77, arm 76 and link 75 to operate the switch mechanism and thus stop the motor 62.

The clamping means 60 are arranged to engage the upper portion of the load and maintain it on the load engaging and carrying member 17 while the load is in transit and while it is being moved upwardly and downwardly. As shown, the raising and lowering means 112 is interconnected with the clamping means 60 so that the latter is first operated to clamp the load in the operation of picking it up, and in discharging a load, the engagement of the load with its support in paying out the chains serves to effect automatic release of the clamping means from the load. The bars 59 are mounted at their inner ends on stud shafts 83 mounted on the inner walls of the plates 32 and carry at their outer ends a clamping member 84, such ends being preferably pivoted to up-standing ears 84*a*. The bars 59 and ears 84*a* are formed with series of openings to permit of adjustment of the member vertically relative to the engaging and lift elements 17′ or horizontally relative the vertical portions thereof.

The clamping member 84 is normally maintained in an inoperative position, that is, in an elevated position, against a stop 84′, to permit the elements 17′ to be projected below the load with the clamping member above it. The clamping member 84 is preferably held in elevated position by one or more sets of devices 85, each set comprising the following: 85*a* indicates a yoke member pivoted at one end to the adjacent bar 59′. The yoke member straddles a compression spring 85*b* and its opposite end is bent to form a seat 85*c* for one end of the spring 85*b*. 86 indicates a rod suitably fixed to and depending from a cross member 86*a* rotatably supported at its opposite ends in the plates 32 near their upper ends. The rod 86 extends through an opening formed in the seat 85*c* (being guided by the walls of the opening) and carries at its free end a collar 86*b* which forms a seat for the opposite ends of the spring 85*b*. The springs 85*b* are of a size and strength to act through the yoke members 85*a* to normally hold the clamping member 84 in its elevated position and are preferably strong enough to overcome the weight of the load engaging and carrying member 17 so that the clamping member 84 will remain in elevated position when the member 17 is being operated without a load, but when this member engages a load, the increase in weight resulting therefrom will cause the pull on the chains 119*a* to operate the clamping member 84 as lifting of the load takes place, and thus clamp the load on the member 17.

84*x* indicates a stop to limit movement of the arms 59 downwardly and thus enable the raising and lowering means to be effective where the load is not large enough to be clamped by the member 84.

From the foregoing description it will be seen that I have provided an elevating member capable of moving upwardly and downwardly and that such member is mounted on a transversely movable carriage, making it possible to move such member or a load thereon upwardly and downwardly and also laterally, whereby such member may be readily moved or adjusted into operative relationship to a load or the support or devices on which a load is to be discharged. This form of construction permits the load engaging member to be moved laterally when in its lowermost position (see dotted lines on the lower side of Fig. 2) or when in its raised position (see dotted lines on the upper side of Fig. 2) or when in any intermediate position.

It will also be seen that the construction is relatively simple and easily controlled. In the illustrated construction, the driver's station is at the outer end of the frame section 1*a* and adjacent thereto I provide a controller 87 having a handle 87*a* for operating the motor 135 and a handle 88 connected by a shaft 90 to a controller 91 for operating the motor 62. By operating both controllers 87 and 91, the elevating member 17 may be operated upwardly or downwardly and laterally simultaneously.

To those skilled in the art to which my invention relates, many changes in construction and widely differing embodiments and applications thereof will suggest themselves without departing from the spirit and scope of the invention. My disclosures and the description herein are purely illustrative and are not intended to be in any sense limiting.

What I claim is:

1. In a power driven industrial truck comprising a frame having a relatively low portion at one end, wheels for supporting the opposite ends of said frame, a support mounted on said low portion to move laterally at substantially right angles to the direction of travel of said frame, inclined guides mounted on the outer portion of said support, a member slidably mounted on said guides and arranged to be projected below a load to lift it, and means for operating said support and said member.

2. In a power driven industrial truck, the combination of a frame, wheels for supporting the opposite ends of said frame, certain of said wheels being power driven, an elevating member arranged to be projected below a load to lift it for transportation, a support having guide means for slidably supporting said member for movement in a predetermined plane upwardly and downwardly, guide means on said frame on which said support and member are movable laterally in a predetermined plane at right angles to the direction of travel of the truck, means for moving said member upwardly and downwardly in any position of said support, and means for moving said support on its guide means laterally in any position of said elevating member.

3. In a power driven industrial truck, the combination of a frame, wheels for supporting said frame, a base member mounted to move laterally on said frame at substantially right angles to the direction of travel of said frame, a load engaging and carrying member slidably mounted on said base member arranged to be projected below a load and lift it for transportation, and power means on said base member for raising and lowering said load carrying and engaging member.

4. In a power driven industrial truck, the combination of a frame, wheels for supporting said frame, a base member mounted to move laterally on said frame at substantially right angles to the direction of travel of said frame, a load engaging and carrying member slidably mounted on said base member arranged to be projected below a load and lift it for transportation, power means on said base member for raising and lowering said load carrying and engaging member, and means on said frame for moving said base member laterally.

5. In a power driven industrial truck, the combination of a frame, wheels for supporting said frame, a base member mounted to move laterally on said frame at substantially right angles to the direction of travel of said frame, a load engaging and carrying member slidably mounted on said base member arranged to be projected below a load and lift it for transportation, power means on said base member for raising and lowering said load carrying and engaging member, means on said frame for moving said base member laterally, and interengaging devices between said frame and said base member for guiding it.

6. An apparatus as claimed in claim 5 in which inter-locking elements are provided between said frame and base member to prevent the latter from tipping.

7. In a power driven industrial truck, the combination of a frame, a load engaging and carrying member arranged to be projected below a load and lift it for transportation, means on said frame for supporting said member to bodily move laterally at substantially right angles to the direction of travel of said frame, upwardly and inwardly inclined guides between said supporting means and said member on which the latter is movable upwardly and downwardly, and separate means for moving said member on said guides and said supporting means laterally.

8. In a power driven industrial truck, the combination of a wheel mounted frame, a pair of tracks extending transversely of said frame at substantially right angles to the direction of travel of the truck, a base member having rollers mounted to roll on said tracks, a load engaging and carrying member mounted to slide upwardly and downwardly on said base member and arranged to be projected below a load when the truck is driven forwardly and lift it for transportation, means on said base member for operating said load engaging and carrying member, and means for moving said base member along said tracks in either direction.

9. An apparatus as claimed in claim 8 in which the last mentioned moving means is mounted on said frame.

10. An apparatus as claimed in claim 8 in which the last mentioned moving means comprises a pair of spaced racks, a shaft having pinions engaging said racks, said elements being mounted on said base member and frame, and a power means on said frame for operating the elements carried by it.

11. An apparatus as claimed in claim 8 in which said frame carries a device arranged to engage the upper portions of the rollers mounted on one of said tracks.

12. In apparatus of the class described, the combination of a frame having a main section and a low section, wheels for said frame, transversely arranged tracks carried by the outer portion of said low section and inner end of said main section, a base member provided with rollers along its inner portion engaging the track on the inner end of said main section and having a depending portion at its outer end provided with rollers engaging the tracks on said low section, a load engaging and carrying member on said base member, a power means on said low section below said base member and elements between said power means and said base member for moving the latter transversely.

13. In a power driven industrial truck, the combination of a frame, wheels for supporting said frame, a base member mounted to move laterally on said frame at substantially right angles to the direction of travel of said frame, a load engaging and carrying member slidably mounted on said base member and having a portion arranged to be projected below a load when the truck is driven forwardly and lift it for transportation, and power operated means for raising and lowering said load engaging and carrying member.

14. In a power driven industrial truck, the combination of a frame, wheels for supporting said frame, a base member mounted to move laterally on said frame at substantially right angles to the direction of travel of said frame, a load engaging and carrying member slidably mounted on soid base member and having a portion arranged to be projected below a load when the truck is driven forwardly and lift it for transportation, power operated means for raising and lowering said load engaging and carrying member, and power operated means for moving said base member laterally.

15. In a power driven industrial truck, the combination of a frame, supporting wheels therefor, a pair of superposed supports, the upper one being mounted on the lower one to move longitudinally of said frame but in an inclined direction and the lower one being mounted on a portion of said frame to move at substantially right angles to the direction of travel thereof, a load carrying member carried by said upper support and arranged to be projected below a load to lift it for transportation, and means for moving each of said supports.

16. An apparatus as claimed in claim 14 in which are provided means operatively connected with and arranged to be actuated by the raising and lowering means for clamping a load on said load-engaging and carrying member.

17. In a power driven industrial truck, the combination of a wheel mounted frame, a base mounted to slide transversely on said frame at substantially right angles to the direction of travel of said frame, guide devices on said base, an elevating member slidably mounted on said devices and having a depending portion carrying a load carrying device at its lower end and arranged to be projected below a load when the truck is driven forwardly and lift it for transportation, and separate means for moving said base and said member.

18. In a power driven industrial truck, the combination of a wheel mounted frame, a base mounted to slide transversely on said frame at substantially right angles to the direction of travel of said frame. guide devices on said base, an elevating member slidably mounted on said devices and having a depending portion carrying a load carrying device at its lower end and arranged to be projected below a load when the truck is driven forwardly and lift the load for transportation, means on said frame below said base for operating it, and means on said base for operating said member.

19. In apparatus of the class described, the combination of a wheel mounted frame having a main section and a low section at one end, guides carried by the outer portions of said sections and extending at substantially right angles to the direction of travel of said frame, a base having portions engaging said guides and supporting it in spaced relation to said low section, means on said low section for operating said base, an elevating member slidably mounted on the outer end of said base, and means on said base for operating said member.

20. In apparatus of the class described, the combination of a wheel mounted frame having a main section and a low section at one end, transverse guides carried by the outer portions of said sections, a base having portions engaging said guides and supporting it in spaced relation to said low section, means on said low section for operating said base, guide devices mounted on the outer portion of said base and arranged in an inclined plane extending upwardly and inwardly, an elevating member slidably mounted on said guide devices, and means on said base for operating said member.

21. In apparatus of the class described, the combination of a wheel mounted frame, a base slidably transversely on said frame, an elevating member slidable upwardly and downwardly on said base, a clamping device movably mounted on said member, means normally tending to move said device away from the load carrying portion of said member, and raising and lowering means for said member connected with said device and arranged to move it in the opposite direction when said load carrying portion engages a load.

22. In apparatus of the class described, the combination of a wheel mounted frame, a base slidable transversely on said frame, an elevating member slidable upwardly and downwardly on said base, a clamping device movably mounted on said member, means normally tending to move said device away from the load carrying portion of said member, raising and lowering means for said member connected with said device and arranged to move it in the opposite direction when said load carrying portion engages a load, and means for limiting the movement of said device in either direction.

23. In a power driven industrial truck, the combination of a frame, wheels for supporting the opposite ends of said frame, certain of said wheels being power driven, guide means on said frame, a support slidably mounted on said guide means, an elevating member having a load engaging portion arranged to project below a load to lift it for transportation, guide means on said support for slidably supporting said elevating member thereon, said last named guide means extending in an inclined direction, and separate means for moving said support and said elevating member.

24. In an industrial truck, a main frame, dirigible and traction wheels supported beneath the frame adapted to carry the load on the truck, a load carrying member overhanging one end of the truck beyond both the dirigible and traction wheels, a lateral guideway on the frame, a carriage for supporting said load carrying member and movable on said guideway to move said member to adjust the same for picking up or depositing a load, power means on said frame to move the carriage laterally on said guideway, and anti-friction means interposed between the load carrying member and carriage, including a set of rollers in fixed position on one of the two last mentioned elements, and a trackway for the rollers on the other of these elements.

In testimony whereof, I have hereunto subscribed my name.

EDWARD H. REMDE.